United States Patent [19]
Oliverius

[11] 3,818,593
[45] June 25, 1974

[54] BLADE FOR MATERIAL STRIPPING APPARATUS

[76] Inventor: Wesley Joseph Oliverius, 1332 Fisherman Rd., Norfolk, Va. 23503

[22] Filed: Sept. 15, 1972

[21] Appl. No.: 289,723

Related U.S. Application Data

[63] Continuation-in-part of Ser. No. 147,766, May 28, 1971, Pat. No. 3,726,565.

[52] U.S. Cl................................... 30/169, 294/55
[51] Int. Cl........................................... A47l 13/02
[58] Field of Search........ 30/169, 171, 172; 15/142, 15/93 R; 294/49, 54, 55, 56

[56] References Cited
UNITED STATES PATENTS

| | | | |
|---|---|---|---|
| 656,093 | 8/1900 | Caruthers | 294/49 |
| 827,542 | 7/1906 | Lawson | 294/54 X |
| 902,983 | 11/1908 | Manahan | 294/49 |

*Primary Examiner*—Al Lawrence Smith
*Assistant Examiner*—J. C. Peters
*Attorney, Agent, or Firm*—Browne, Beveridge, De-Grandi & Kline

[57] ABSTRACT

A blade for a material stripping machine including a movable carriage on which is located a motor for providing reciprocating motion to a blade member having a cutting edge for stripping material. The cutting edge of the blade member comprises a series of beveled teeth, and the body of the blade member has projecting upwardly therefrom at least one subsidiary cutting member having a cutting edge facing the cutting edge of the blade member for cutting through material stripped by the blade. The blade may also be provided in the form of a hand tool which may be used to remove shingles. Preferably a plurality of slots are provided in the recesses between the teeth to enable removal of shingle nails.

5 Claims, 7 Drawing Figures

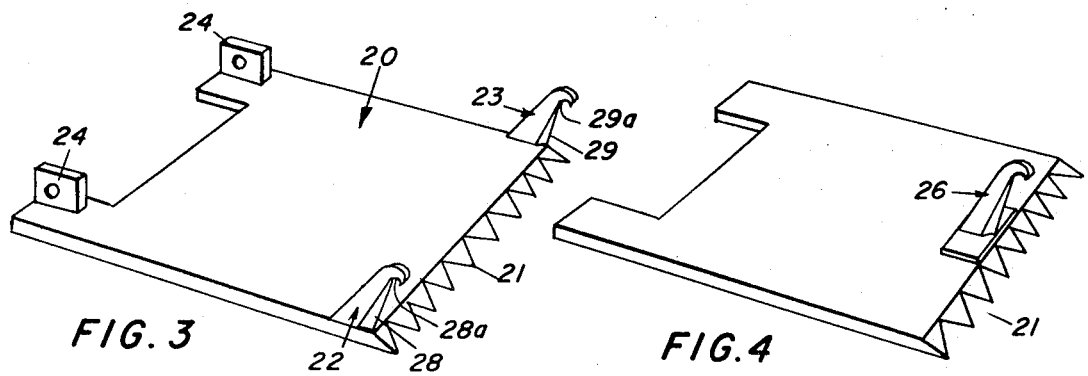
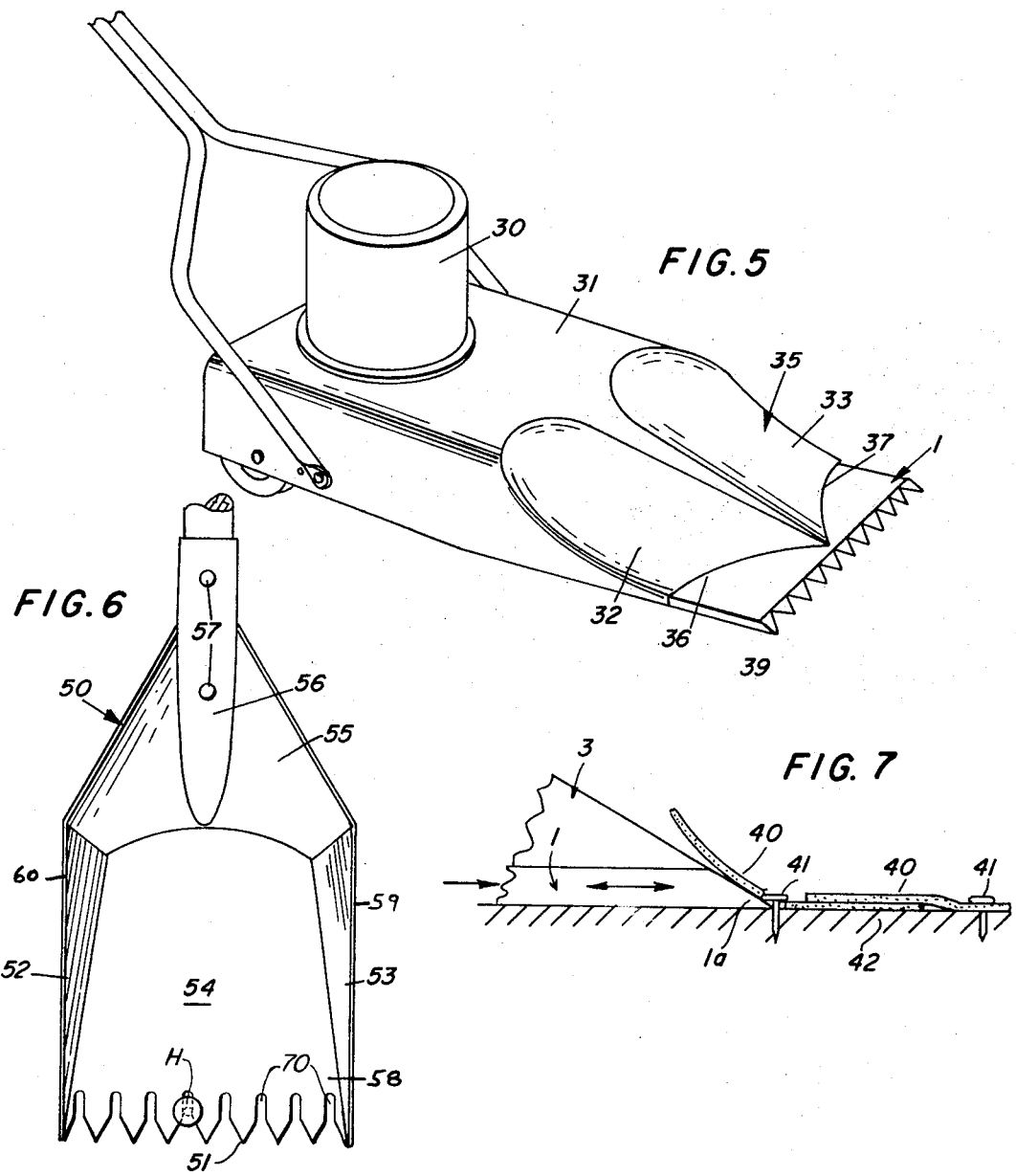

BLADE FOR MATERIAL STRIPPING APPARATUS

RELATED APPLICATION

This application is a continuation-in-part of my pending U.S. Pat. application Ser. No. 147,766, filed May 28, 1971, entitled Material Stripping Apparatus And Blade now U.S. Pat. No. 3,726,565 dated Apr. 10, 1973.

BACKGROUND OF INVENTION AND OBJECTS

This invention broadly relates to stripping sections of material such as roofing shingles or the like from a surface to which they are bonded and/or nailed. More specifically, the invention relates to a new and improved blade member which may be used with a material stripping machine or incorporated in a manual stripping tool. Although the blade or stripping tool is highly suited for removing shingles from a roof surface, it may also be used for stripping sections of any type of covering material.

One problem associated with stripping machines of the prior art has been their inability to effectively remove shingles or sections of other material which are wider than the width of the stripping blade. The present invention obviates this problem by providing a stripping blade member which has projecting upwardly therefrom, at least one subsidiary cutting member for cutting through the portion of the shingle or section of other material which is operated on by the stripping blade. Thus the blade of the present invention is effective to strip shingles or sections of material even though the shingles or sections are much wider than the width of the stripping blade.

Another deficiency of prior stripping machines has been their inability to get under the material to be stripped and also to sever and remove nails or other similar fasteners securing the material to the underlying surface. This problem is also overcome by the present invention.

It is therefore an object of the present invention to provide a novel and improved blade for use in stripping material such as roofing shingles from a roof or the like.

It is a further object of the invention to provide such a novel material stripping blade which has thereon at least one subsidiary cutting member for cutting through material stripped by the blade member.

A still further object of the invention is to provide a new and improved stripping blade which in operation, will pass under the material to be stripped and sever and remove any nails or other fasteners securing the material to thus provide highly effective stripping.

Another object of the invention is to provide a manual stripping tool which incorporates the new and improved stripping blade of the present invention and which is effective to remove any fasteners securing the material to be stripped and to cut through and sever the material stripped.

SUMMARY OF INVENTION

One machine incorporating the blade member of the present invention includes a movable carriage in which a motor is mounted for reciprocating the stripping blade member situated in the front end of the carriage. The cutting edge of the stripping blade has a plurality of beveled teeth extending there across which teeth have the ability to dig under the material to be stripped and to sever and remove nails holding down the material to be stripped. It is preferred that the stripping blade have at least one subsidiary cutting member projecting upwardly therefrom for cutting through material stripped by the blade. Located behind the stripping blade is a diverter structure for diverting stripped material to either side of the apparatus. In one embodiment, the blade member has two such subsidiary cutting members positioned at opposite sides of the blade adjacent the teeth. In another embodiment, the subsidiary cutting member is positioned at the center portion of the blade.

The block member may also be incorporated in a manual shovel-like tool with or without the subsidiary cutting members. It is preferred that elongated slots be provided between each teeth to allow roofing nails to be captured under the head of the nails for easy removal.

Other objects and advantages of the present invention will become apparent from the following detailed description in conjunction with the attached drawing in which:

FIGS. 3 and 4 are perspective views showing alternate embodiments of the improved blade of the present invention;

FIG. 5 is a perspective view of another embodiment of the machine incorporating the blade member of the present invention;

FIG. 6 is a view of a manual stripping tool incorporating a blade embodying the invention; and FIG. 7 is a side view showing the blade member in the process of stripping a section of material from a surface.

DETAILED DESCRIPTION

Figure 1:
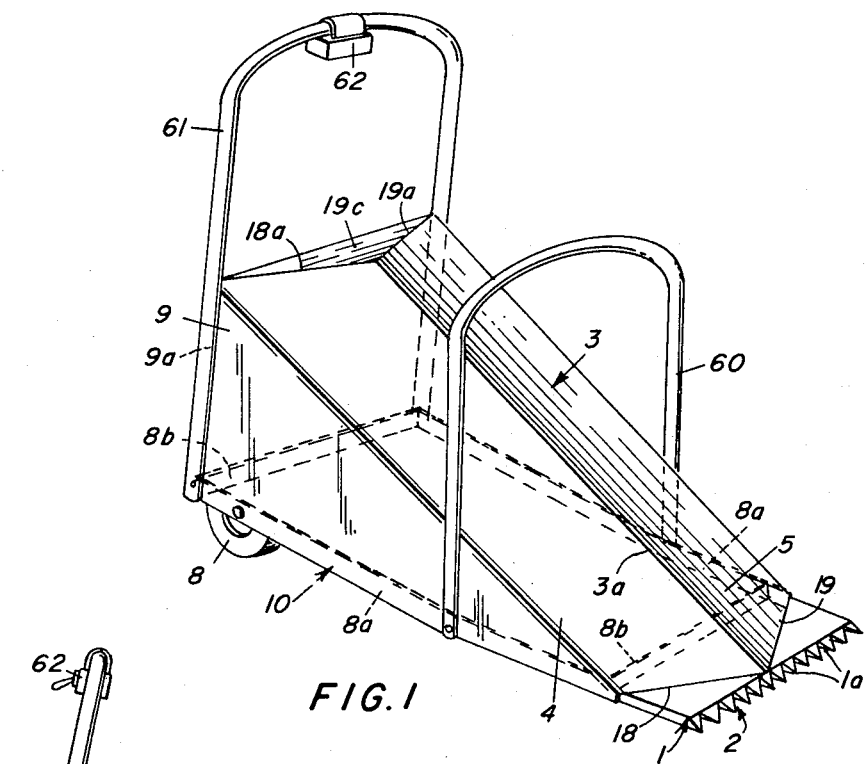
FIG. 1 is a perspective view of a machine incorporating a blade member embodying the present invention.
Figure 2:
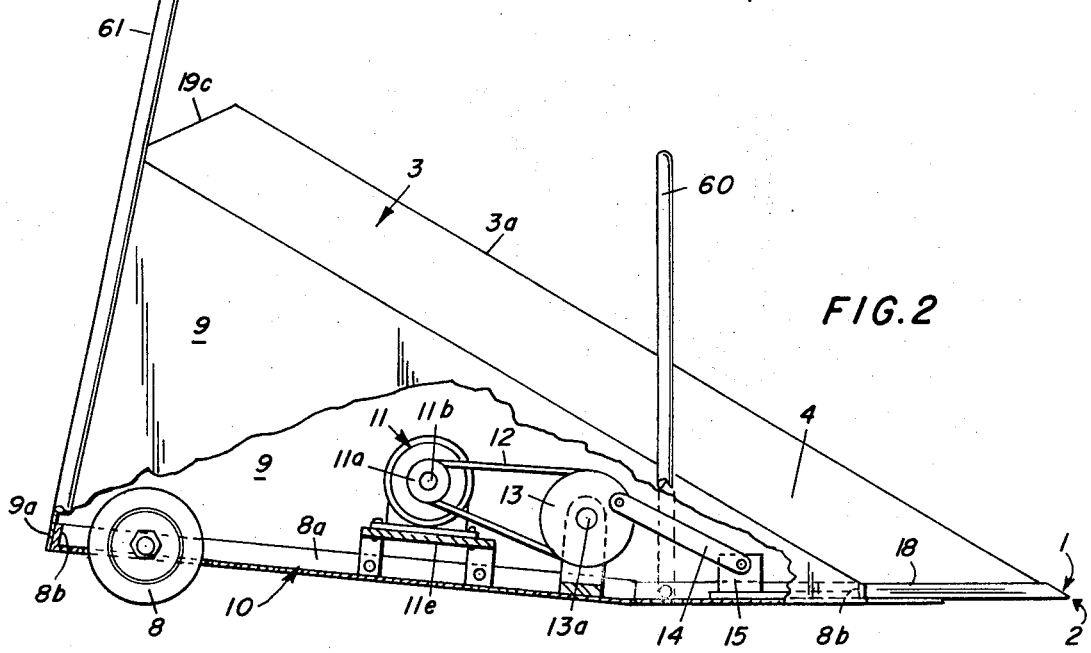
FIG. 2 is a side view of the machine shown in FIG. 1 with a side wall of its housing partially removed to show components therein.

Referring to the drawings in detail and initially FIGS. 1 and 2, there is shown for illustrative purposes only, a material stripping machine incorporating a blade 1 embodying the present invention. The machine includes a carriage 10 supported at its rear end by wheels 8 which are mounted in any suitable frame which may comprise opposite side members 8a interconnected by opposite end members 8b to form a rigid rectangular structure. The frame members may be made from any suitable material such as steel. Wheels 8 may be mounted directly to the frame members themselves as in the shown embodiment or may be mounted on a cross axle (not shown) which in turn is mounted in the frame members 8a.

Located on carriage 10 is a motor generally designated 11 which includes a drive pulley 11a operatively connected to a fly wheel 13 to drive the same in rotation by means of a pulley belt 12. Pulley belt 12 in this specific embodiment is mounted to a pulley (not shown) which in turn is secured to a shaft 13a to which the fly wheel 13 is rigidly fixed. In this specific embodiment, another pulley 11a and fly wheel 13 combination is provided on the other side of the carriage; the pulleys 11a being fixed to a shaft 11b driven by motor 11. Motor 11 may be supported on frame 8a by a cross strut 11e having its opposite ends fixed to frame members 8a. Fly wheels 13 each have a linkage member 14 eccentrically mounted thereto which linkage member 14 is pivotally connected at its other end with respect to blade member 1 by means of an attachment lug 15 for providing reciprocating motion to the blade member. The carriage and motor mechanism is enclosed by a housing including opposite vertical side walls 9, an end wall 9a, and a diverter means 3 located between the side walls and projecting forwardly and downwardly from end wall 9a. A conventional U-shaped handle 61 with an on-off switch 62 for switching the motor on is located at the rear of the carriage and another U-shaped handle 60 is located at a point in front of the mid-point of the carriage.

In the front of the machine, blade member 1 is slidably mounted on frame 10 for reciprocation in a plane parallel to the frame 10. Blade member 1 has across its front end, a cutting edge 2 comprised of a plurality of beveled teeth 1a. The teeth 1a are triangular with pointed extremities which are aligned in a saw tooth configuration. Beveled teeth 1a are used in the manner illustrated in FIG. 7 to engage under and strip material such as shingles 40 from an underlying surface 42. The bevel of the cutting edge teeth 1a allows them to dig under material to remove it from the surface to which it is bonded or otherwise secured. Additionally, the spacing of the teeth 1a is arranged so that nails or tacks such as 41 shown in FIG. 7, which secure material 40 to surface 42 may be engaged and severed in the space between teeth 1a and pried out of surface 42 when the blade member moves forwardly during operation.

Diverter means 3 includes surfaces 4 and 5 which act to divert stripped material to either side of the machine out of the path of the machine during operation. Surfaces 4 and 5 are flat, and at their forward ends, have bottom edges 18 and 19 respectively which meet each other substantially at the center of the cutting edge 2 of blade 1. Additionally, surfaces 4 and 5 incline upwardly in the direction away from the blade toward the rear of the machine while also sloping laterally downwardly to opposite sides of the machine from a common line 3a which joins the juncture of edges 18 and 19 at the plane of blade member 1. In this specific embodiment shown, surfaces 4 and 5 terminate at their upper ends at edges 18a and 19a such that surfaces 4 and 5 are connected to rear end wall 9a by a triangular section 19c as shown in FIG. 1.

The unique geometrical arrangement of surfaces 4 and 5 provides extremely effective diversion of shingles or other sections of material stripped by the machine. In this latter regard, material stripped by blade 1a begins to move upwardly along surfaces 4 and 5 and subsequently laterally and downwardly along surfaces 4 and 5 to opposite sides of the machine. It will be seen that the hood and diverter structure also acts as a guide member for the blade 1a to ensure that it remains in a plane generally parallel to the frame of the carriage. During use, the machine is pushed forwardly by the operator via handle 61 and the machine is manipulated upwardly or downwardly by pivoting it about wheels 8; it being understood that no wheels are provided at the front end of the carriage. An additional handle 60 is provided at the front of the machine and in certain circumstances it may be more expedient to manipulate the machine by the use of this handle. Additionally, the second handle may be used by a second man in situations where it is desirable to have two men manipulate the machine.

The embodiment of the machine shown in FIG. 5 may be considered to be a streamline version of the machine shown in FIGS. 1 and 2. In this embodiment, the motor is located within motor housing 30 situated on top of housing 31 which is considerably lower in height than the housing used in the embodiment of FIGS. 1 and 2. Diverter means 35 is comprised of surfaces 32 and 33 which are concave surfaces as shown in FIG. 5 having curved bottom surfaces which extend rearwardly of the cutting blade. The diverting action of diverter means is very similar to that of the diverter means 3 in the embodiment of FIGS. 1 and 2. The drive and reciprocating mechanism in the present embodiment may be similar to that in the embodiment of FIGS. 1 and 2.

FIGS. 3 and 4 illustrate two embodiments of an improved blade member further in accordance with the present invention. Blade member 20 has a transverse cutting edge 21 in its forward end consisting of a plurality of beveled teeth which are used to strip material in the manner shown in FIG. 7 as explained above. In the FIG. 3 embodiment, the blade member has a pair of subsidiary cutting members 22 and 23 projecting upwardly therefrom on the opposite side edges of the blade member just rearwardly of cutting edge 21 as shown in FIG. 3. Subsidiary cutting members 22 and 23 may be fixed in any suitable manner such as by welding to the blade member. Subsidiary cutting members 22 and 23 have forwardly facing cutting edges including vertically extending edges 28 and 29 terminating in hooked cutting edges 28a and 29a at the top thereof. Additionally, blade member 20 has a pair of attachment means 24 at the rear end thereof for attachment to a drive member. In the embodiment of FIG. 4 which is illustrated without attachment means 24, a single subsidiary cutting member 26 is secured to the central portion of the blade in alignment with the mid-point of the cutting edge 21 of the blade. Cutting member 26 is the same as 22 and 23.

The function of the subsidiary cutting members 22, 23 and 26, is to cut through material such as roofing shingle or tar paper which has been stripped by cutting edge 21. This is extremely useful in cases where the shingle or material to be stripped is several times wider than the cutting edge 21, in which case without the subsidary cutting members, it would be difficult if not impossible to remove sections of the shingle from the surface in one pass of the machine. It will further be seen that the subsidiary cutting members will cut the stripped material into discrete pieces which not only allows the cutting operation to proceed but further facilitates guidance of the removed pieces to either side of the machine by the diverter mechanism and subsequent handling and disposal of the removed pieces.

FIG. 6 shows a manual stripping tool 50 resembling a shovel and incorporating the blade of the present invention. Handle member 56 (not shown in its entirety) is secured to curved connecting member 55 by attachment means 57. Curved connecting member 55 is attached at its lower end to plane surface 54 which has a cutting edge comprised of a plurality of beveled teeth at its front end similar to the teeth described above. It is preferred that elongated slots 70 be formed between each of the teeth 51 as shown, for receiving roofing nails or the like below the heads of the nails to enable easy removal. Slots 70 open into the tooth edge and are dimensioned in width less than the diameter of the heads of roofing nails.

Extending rearwardly from cutting edge 51 at each end thereof are subsidiary guiding and/or cutting members 52 and 53. If desired, these members may be formed with knife-edge cutting edges 60 and 59 on their topmost surfaces. Members 52 tapered upwardly as they extend rearwardly so that the height of the cutting edge is greater near the rear of plane surface 54 than at the front of it. Additionally, members 52 and 53 are flanged outwardly so that they join plane surface surface 54 at an angle between 90° and 180°. Members 52 and 53 may be integrally formed with plane surface 54. Additionally, members 52 and 53 join curved connecting members 55 at their rear ends to form a unitary structure. In use manual stripping tool 50 is manipulated by handle 56 to strip shingles or other material which may be secured by nails or other fasteners. It is moved in a forward motion under the material to be stripped so that the nails or fasteners may be directly engaged and removed by teeth 51 as shown in FIG. 7. In addition, the nails may be received in elongated slots 70 with the head H of the nail overlying the slot 70 as shown in FIG. 6. The nail may then be easily pried out. Subsidiary members 52 and 53 may be used to wedge the material to be stripped upwardly thus facilitating stripping and removal.

What is claimed is:

1. A manual stripping tool for stripping material such as shingles comprising a shovel-like stripping member adapted to be attached to a handle member for manipulating the stripping tool, said stripping member comprising a body having a flat plane surface for receiving stripped material and further having a cutting edge at its front end comprised of a plurality of beveled teeth for stripping material, and said body further having a pair of laterally spaced subsidiary members projecting upwardly from said body for wedging upwardly material to be stripped by said cutting edge, said subsidiary member being flanged outwardly from said flat plane surface so that they meet said plane surface at an obtuse angle between 90° and 180°.

2. The manual stripping tool of claim 1 wherein said subsidiary members project upwardly only a slight amount adjacent said cutting edge and are tapered gradually upwardly as they extend rearwardly away from the cutting edge so that they project upwardly from said flat surface a greater amount at a point rearward of said cutting edge.

3. The manual stripping tool of claim 1 wherein said subsidiary members are formed with knife-edge cutting edges on their uppermost surfaces.

4. The manual stripping tool of claim 1 wherein said cutting edge has a number of elongated slots opening into the cutting edge between adjacent teeth for receiving and removing nails or tacks, the width of said slots being less than the diameter of the head of the nail to be pried out by engagement of the blade under the head.

5. a manual stripping tool for stripping material such as shingles comprising a shovel-like stripping member adapted to be attached to a handle member for manipulating the stripping tool, said stripping member comprising a body having a surface for receiving stripped material and having a cutting edge at its front end comprised of a plurality of beveled teeth for stripping material, and a pair of laterally spaced subsidiary members projecting upwardly from said body for wedging upwardly material to be stripped by said cutting edge, and wherein said cutting edge has a number of elongated slots opening into the cutting edge between adjacent teeth for receiving and removing roofing nails or tacks, the width of said slots being less than the diameter of the head of the nails to enable the nail to be pried out by engagement of the blade under the head of the nail.

* * * * *